US011870931B2

(12) United States Patent
Swerdlow

(10) Patent No.: US 11,870,931 B2
(45) Date of Patent: Jan. 9, 2024

(54) AUTOMATED CALL QUEUE AGENT CONVERSATION ITEM SELECTION

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/443,949

(22) Filed: Jul. 28, 2021

(65) Prior Publication Data

US 2023/0030202 A1 Feb. 2, 2023

(51) Int. Cl.
*H04M 3/42* (2006.01)
*H04M 3/51* (2006.01)
*G10L 15/26* (2006.01)

(52) U.S. Cl.
CPC ......... *H04M 3/42059* (2013.01); *G10L 15/26* (2013.01); *H04M 3/5175* (2013.01); *H04M 3/5183* (2013.01); *H04M 2201/40* (2013.01); *H04M 2201/42* (2013.01); *H04M 2203/6045* (2013.01)

(58) Field of Classification Search
CPC ........... H04M 2201/42; H04M 3/5183; H04M 3/42059
USPC .......................................................... 455/415
See application file for complete search history.

(56) References Cited

U.S. PATENT DOCUMENTS 6,067,357 A 5/2000 Kishinsky et al.
6,418,440 B1 7/2002 Kuo et al.
8,532,280 B2* 9/2013 Ross .................... H04M 3/5232
  379/265.11
10,847,140 B1* 11/2020 Conner ............... G10L 15/1815
10,868,910 B1 12/2020 Massie et al.
11,335,351 B2* 5/2022 Black .................. G10L 21/0272
(Continued)

FOREIGN PATENT DOCUMENTS

KR 20150131306 A 11/2015

OTHER PUBLICATIONS

Invitation To Pay Additional Fees and Where Applicable, Protest Fee mailed on Oct. 20, 2022 in corresponding PCT Application No. PCT/US2022/036213.
(Continued)

*Primary Examiner* — Harry S Hong
*Assistant Examiner* — Jirapon Tulop
(74) *Attorney, Agent, or Firm* — Young Basile Hanlon & MacFarlane, P.C.

(57) ABSTRACT

Agent conversation item selection is automated by a server that automatically detects speech in a call and converts that speech to text. Software running on the server retrieves one or more items from a data store based on a determination that the text includes one or more keywords or a change in the subject of the call. The keywords can include phrases. The retrieved items include one or more of scripts, articles, manuals, daily bulletins regarding a system state, or any resource that can be used to assist with a customer call or interaction. The software running on the server generates a user interface (UI) output based on the retrieve items, and transmits the UI output to an agent device. Software running on the agent device receives the UI output and displays the retrieved items on a display of the agent device.

20 Claims, 8 Drawing Sheets

(56) References Cited

U.S. PATENT DOCUMENTS

| | | | |
|---|---|---|---|
| 2013/0218882 A1* | 8/2013 | McConnell | G06F 16/24524 707/E17.014 |
| 2014/0164502 A1* | 6/2014 | Khodorenko | H04M 3/5191 709/204 |
| 2015/0170152 A1* | 6/2015 | Shaffer | G06Q 30/016 705/304 |
| 2015/0213512 A1* | 7/2015 | Spievak | G06Q 30/0275 705/14.71 |
| 2016/0191709 A1* | 6/2016 | Pullamplavil | H04M 3/5133 379/266.07 |
| 2019/0364396 A1 | 11/2019 | Jeong | |
| 2021/0392230 A1* | 12/2021 | Shah | H04M 3/523 |

OTHER PUBLICATIONS

International Search Report and Written Opinion dated Dec. 12, 2022 in corresponding PCT Application No. PCT/US2022/036213.

* cited by examiner

AUTOMATED CALL QUEUE AGENT CONVERSATION ITEM SELECTION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
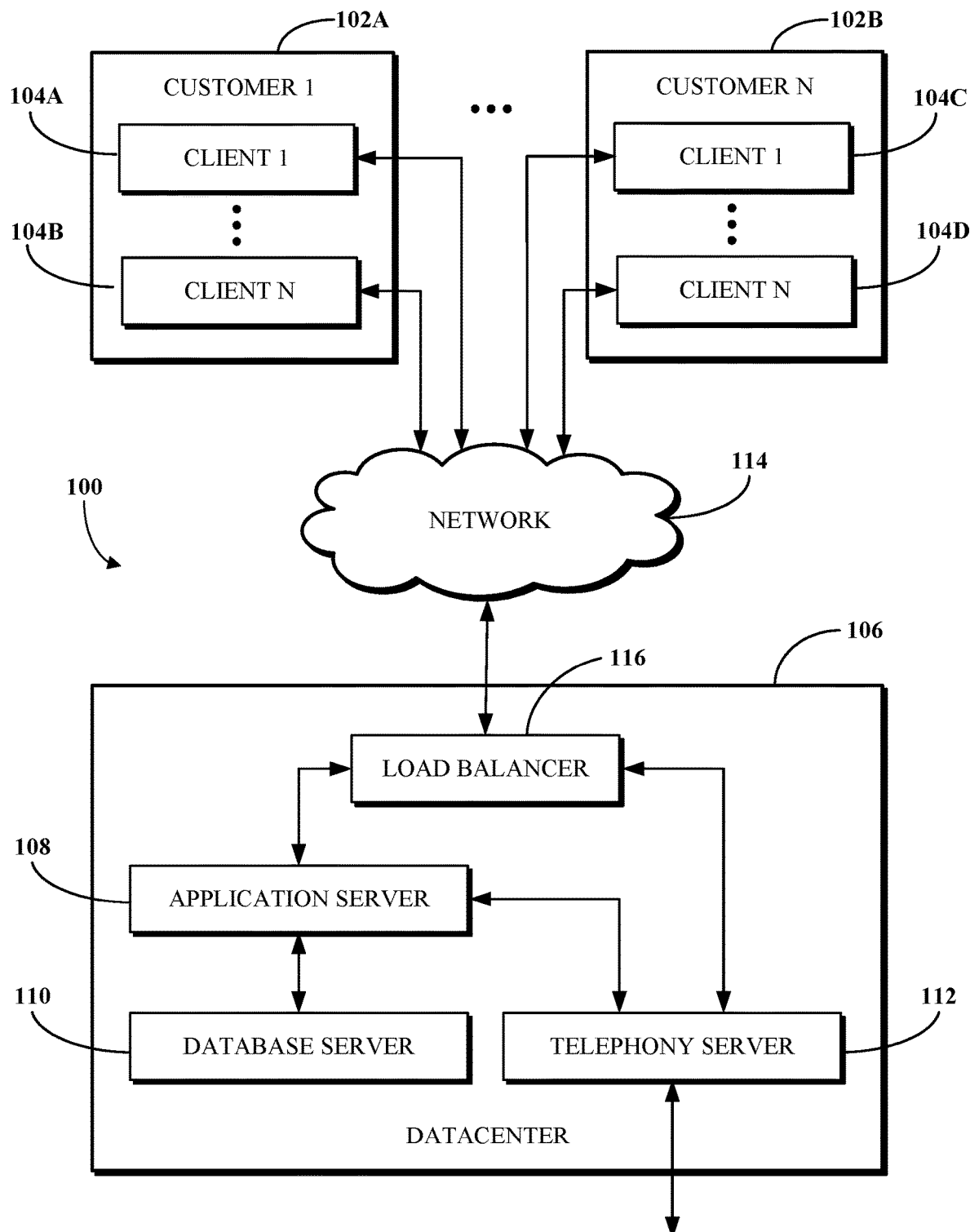
FIG. 1 is a block diagram of an example of an electronic computing and communications system.

Disclosed herein are, inter alia, implementations of systems and techniques for automated call queue agent conversation item selection.

One aspect of this disclosure is a method that includes detecting speech in a call. The method may include converting the speech to text. The method may include determining that the text includes one or more keywords based on location data of a caller. The method may include determining a context of the one or more keywords based on the location data. The method may include retrieving one or more items from a data store. The one or more items may be retrieved based on the context of the one or more keywords. The method may include generating a user interface (UI) output based on the one or more items. The method may include transmitting the UI output to an agent device for display.

Another aspect of this disclosure is a system that includes an agent device and a server. The server may be configured to detect speech in a call and convert the speech to text. The server may retrieve one or more items from a data store. The server may retrieve the one or more items from the data store based on a determination that a subject of the call has changed. The server may be configured to transmit a UI output to display the one or more items on a display of the agent device.

Another aspect of this disclosure includes a non-transitory computer-readable medium that includes instructions stored on a memory, that when executed by a processor, cause the processor to detect speech in a call and convert the speech to text. The instructions, when executed by the processor, cause the processor to retrieve one or more items from a data store. The one or more items may be retrieved based on a determination that a subject of the call has changed. The instructions, when executed by the processor, cause the processor to transmit a UI output to display the one or more items on a display of an agent device.

A UCaaS platform may implement or otherwise facilitate call center or contact center services. A call center includes agents that handle inbound, outbound, or blended phone calls, and a contact center includes agents that handle services that may include interactions associated with voice over internet protocol (VOIP), texts, webchat, video chat, social media, email, and other digital services. Agents at a call center or a contact center use conversation items to assist with customer calls and interactions. Conversation items may include scripts, articles, manuals, daily bulletins regarding a system state, or any resource that can be used to assist with a customer call or interaction. Conventional call center and contact center systems rely on manual access to knowledge base articles and other sources of information to help guide agents to what they need to say to a caller. These systems are static in that they cannot adapt to content and context changes, such as where a caller clarifies that he or she is calling for one issue rather than another issue, or where the caller changes topics and needs help with something new. In a different example, the systems cannot adapt to changes in caller behavior, such as by guiding agents when a caller becomes irate. The additional delay in service by the wait time for the agent to manually access the new information is a burden to callers and ties up considerable system resources.

Implementations of this disclosure address problems such as these by providing a system for automated call queue agent conversation item selection. The system may include a server that is be configured to analyze a call or interaction to identify a problem statement of a caller. The server may perform real-time speech analysis such as using automated speech recognition (ASR) processing to identify one or more keywords to dynamically provide relevant conversation items based on the identified keywords to the agent in real-time. The keywords may include one or more keywords or phrases. The conversation items may include scripts, articles, manuals, daily bulletins regarding a system state, or any resource that can be used to assist with a customer call or interaction. In some examples, a tonal analysis may be performed and may be used alone or in conjunction with the identified keywords to determine a caller attribute.

To describe some implementations in greater detail, reference is first made to examples of hardware and software structures used to implement a system for automated call queue agent conversation item selection. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
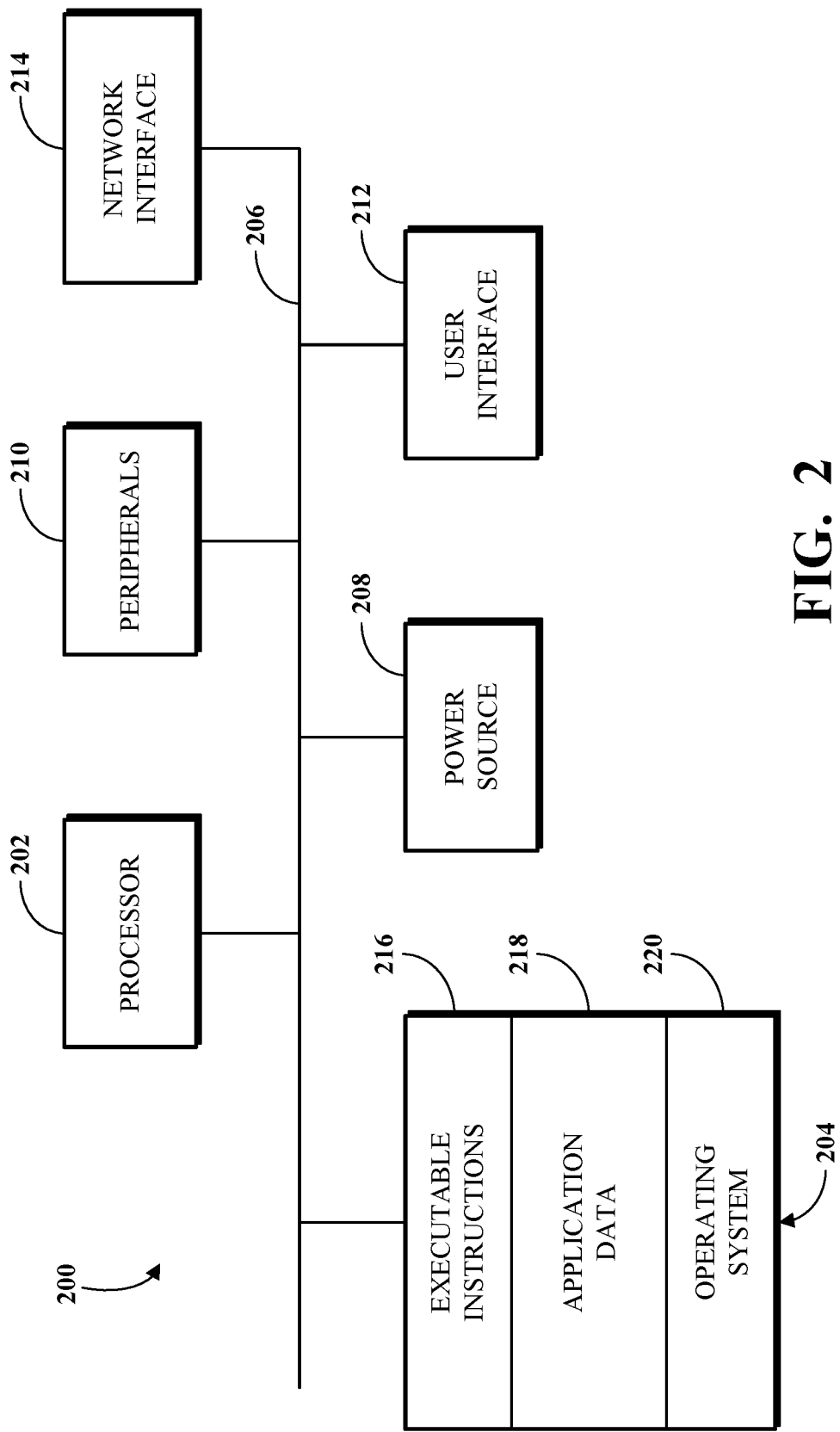
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
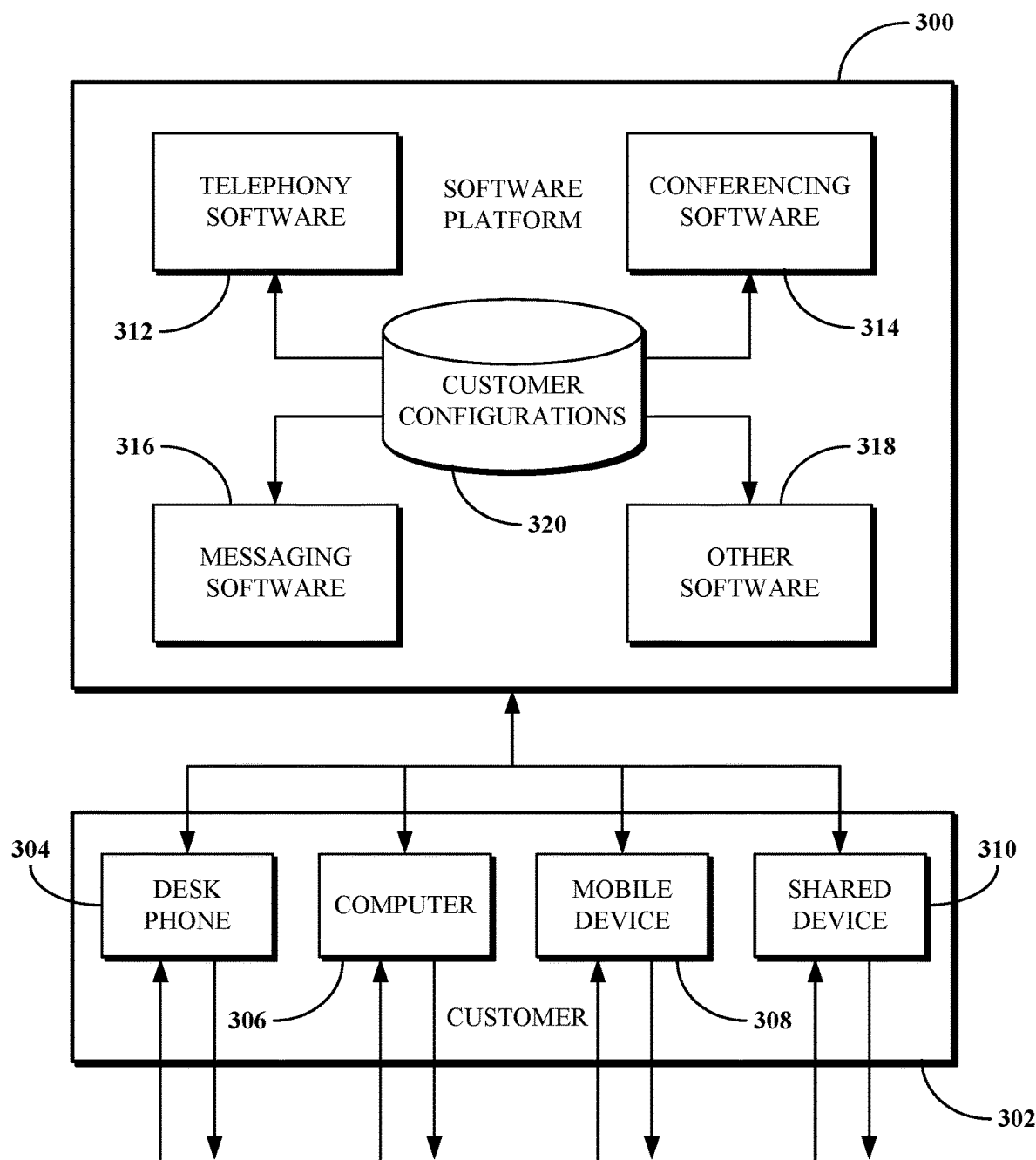
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for automated call queue agent conversation item selection.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
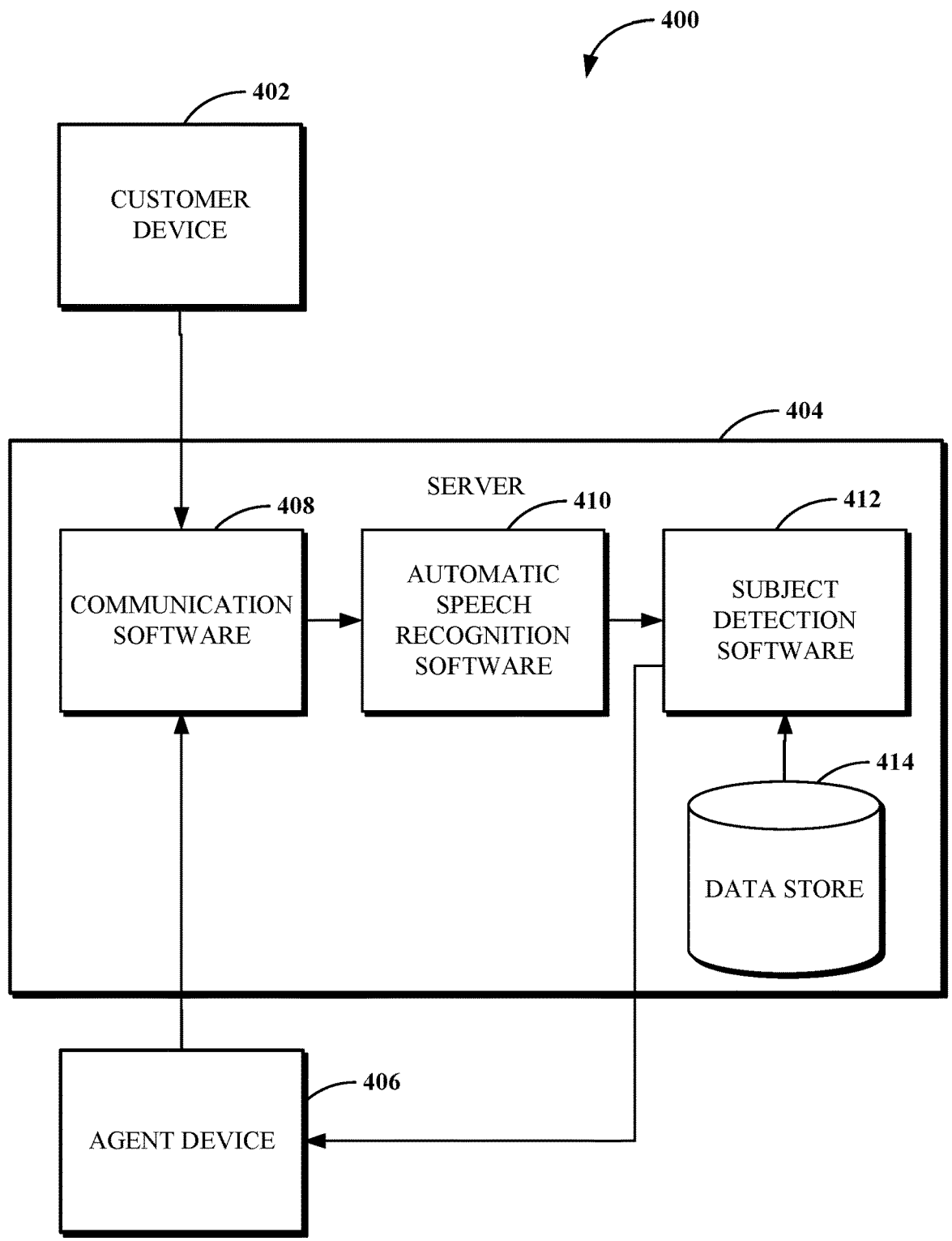
FIG. 4 is a block diagram of an example of a system for automated call queue agent conversation item selection.

FIG. 4 is a block diagram of an example of a system 400 for automated call queue agent conversation item selection. The system 400 includes a customer device 402, server 404, and an agent device 406. The customer device 402 may be a device such as any one of the clients 304 through 310 shown in FIG. 3; however, the customer device 402 does not need to be a client device. The server 404 may be used to implement the software platform 300 shown in FIG. 3. In an example, the automated call queue agent conversation item selection may be implemented by the other software 318. The agent device 406 may be a device at a call center or contact center, such as the datacenter 106 shown in FIG. 1. The agent device 406 may, for example, be a desk phone, a computer, a mobile device, or a shared device.

The customer device 402 and the agent device 404 are configured to communicate with each other via a communication software 408 of the server 404. The customer device 402 and the agent device 406 may communicate with each other using communications that include telephone communications, VOIP communications, short messaging service (SMS) text communications, webchat communications, video chat communications, social media communications, email communications, and other digital service communications.

The server 404 is configured to monitor the communications between the customer device 402 and the agent device 406 using the communication software 408 and an ASR software 410. The ASR software 410 is a transcription engine that is configured to monitor audio signals via the communication software 408. The ASR software 410 is configured to detect speech from audio signals received from the customer device 402, audio signals received from the agent device 406, or both. The ASR software 410 is configured to convert the detected speech to text.

Subject detection software 412 of the server 404 is configured to analyze the text for one or more keywords. The subject detection software 412 may detect a keyword by comparing the text to a list of keywords stored in a data store 414 of the server 404. The list of keywords may include specific words, semantic concepts, or both. The subject detection software 412 may detect a change in a subject of the communication between the customer device 402 and the agent device 406, for example, based on one or more keywords. The subject detection software 412 may be configured to determine a context of one or more keywords. The context of the one or more keywords may be determined using a machine learning (ML) model that can determine a context of a keyword by analyzing data including data associated with a neighboring word range of the keyword, location data to determine a geographic region of the caller, social media data to determine a caller attribute, spending data to determine a caller attribute, or any combination thereof. Based on a detection of one or more keywords, a context of the keywords, a change in the subject of the communication, or any combination thereof, the subject detection software 412 may retrieve one or more conversation items from the data store 414 and transmit the one or more conversation items, or pointers to data indicative thereof within the data store 414, to the agent device 406. The one or more conversation items may be retrieved based on the context of the one or more keywords. The server 404 may transmit the one or more conversation items to the agent device 406 via a UI output.

In an example, the UI output may be displayed on a UI of the agent device 406 as a list of selectable conversation items. The list of conversation items may be displayed in an order of priority, for example, a descending priority from the highest priority conversation item to the lowest priority conversation item. In another example, the UI output may cause the conversation items to be automatically displayed on a UI of the agent device 406. For example, a particular script may be automatically displayed on the UI of the agent device 406.

Figure 5:
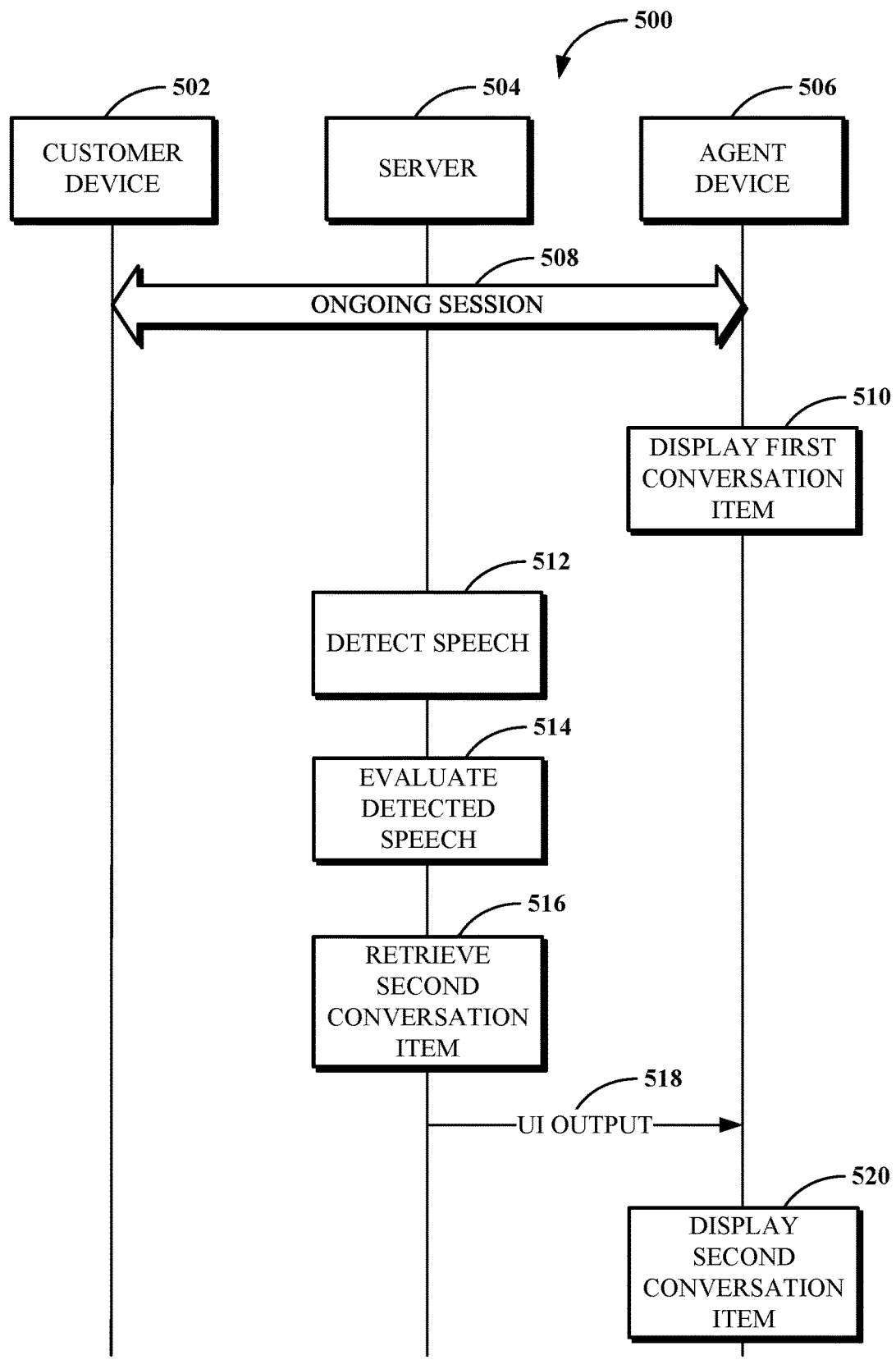
FIG. 5 is a swim lane diagram of an example of a system for automated call queue agent conversation item selection.

FIG. 5 is a swim lane diagram of an example of a system 500 for automated call queue agent conversation item selection. The system 500 includes a customer device 502, a server 504, and an agent device 506. The customer device 502 may be a device such as any one of the devices 304 through 310 shown in FIG. 3. The server 504 may be used to implement the software platform 300 shown in FIG. 3. In an example, the automated call queue agent conversation item selection may be implemented by the other software 318. For example, the other software 318 may include the subject detection software 412 shown in FIG. 4 and the automated call queue agent conversation selection may be performed using the subject detection software 412. The agent device 506 may be a device at a call center or contact center, such as the datacenter 106 shown in FIG. 1. The agent device 506 may, for example, be a desk phone, a computer, a mobile device, or a shared device.

In this example, there may be an ongoing session 508 between the customer device 502 and the agent device 506. Communications of the ongoing session 508 may be routed through the server 504 between the customer device 502 and the agent device 506. The communications may include telephone communications, VOIP communications, SMS text communications, webchat communications, video chat communications, social media communications, email communications, and other digital service communications.

Software running on the agent device 506 is configured to display 510 a first conversation item on a UI of the agent device. The first conversation item may be used by an agent as a guide to assist a customer with their issue.

Software running on the server 504 is configured to monitor the communications of the ongoing session 508 to detect 512 speech. The software running on the server 504 may detect speech in a customer communication, an agent communication, or both.

Software running on the server 504 is configured to evaluate 514 the detected speech. Evaluating the detected speech may include using an ML model to determine a context of a keyword in the detected speech by analyzing data including data associated with a neighboring word range of the keyword, location data to determine a geographic region of the caller, social media data to determine a caller attribute, spending data to determine a caller attribute, or any combination thereof. Evaluating the detected speech may include detecting one or more keywords, determining a context of the keywords, determining a change in the subject of the communication, or any combination thereof.

Software running on the server 504 is configured to retrieve 516 a second conversation item based on the evaluation of the detected speech and transmit a UI output 518 to the agent device 506. The UI output is an output that is generated based on the second conversation item. Software running on the agent device 506 receives the UI output 518 and displays 520 the second conversation item. In some examples, the software running on the agent device may display a link to the second conversation item. Detection of the speech and retrieval of the conversation items will be discussed in greater detail with reference to FIGS. 6 through 8.

Figure 6:
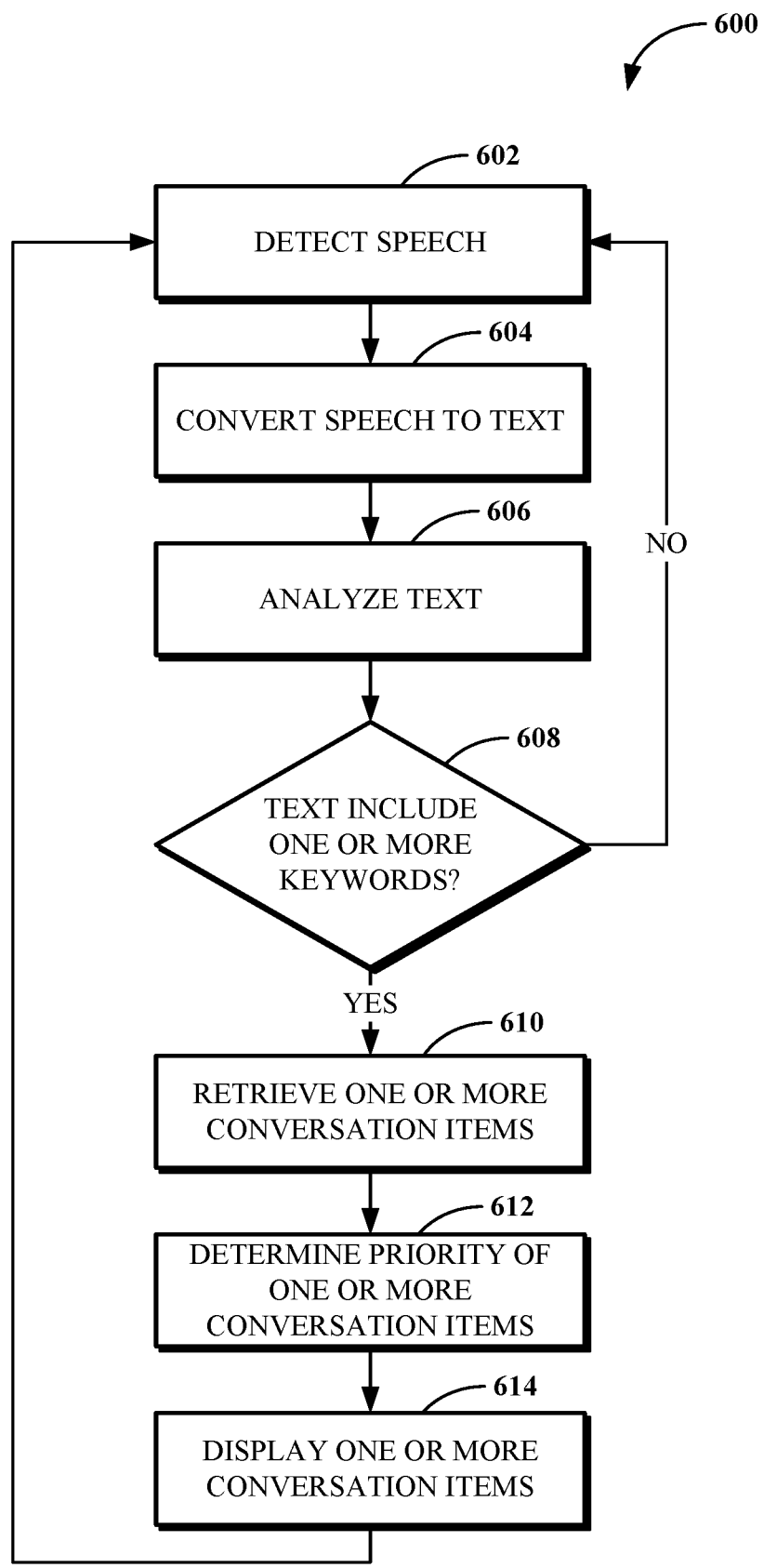
FIG. 6 is a flowchart of an example of a method for automated call queue agent conversation item selection.
Figure 7:
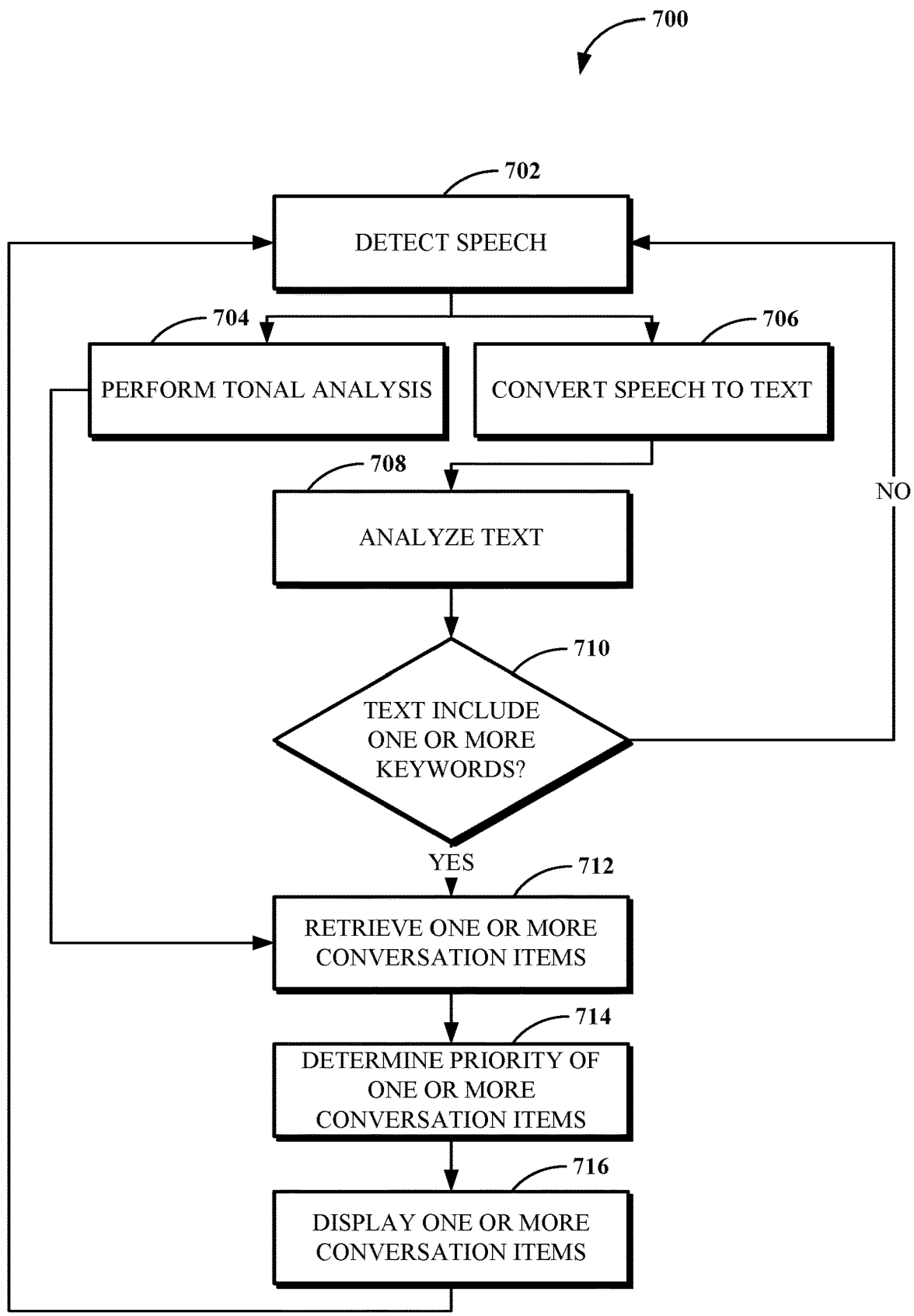
FIG. 7 is a flowchart of an example of another method for automated call queue agent conversation item selection.
Figure 8:
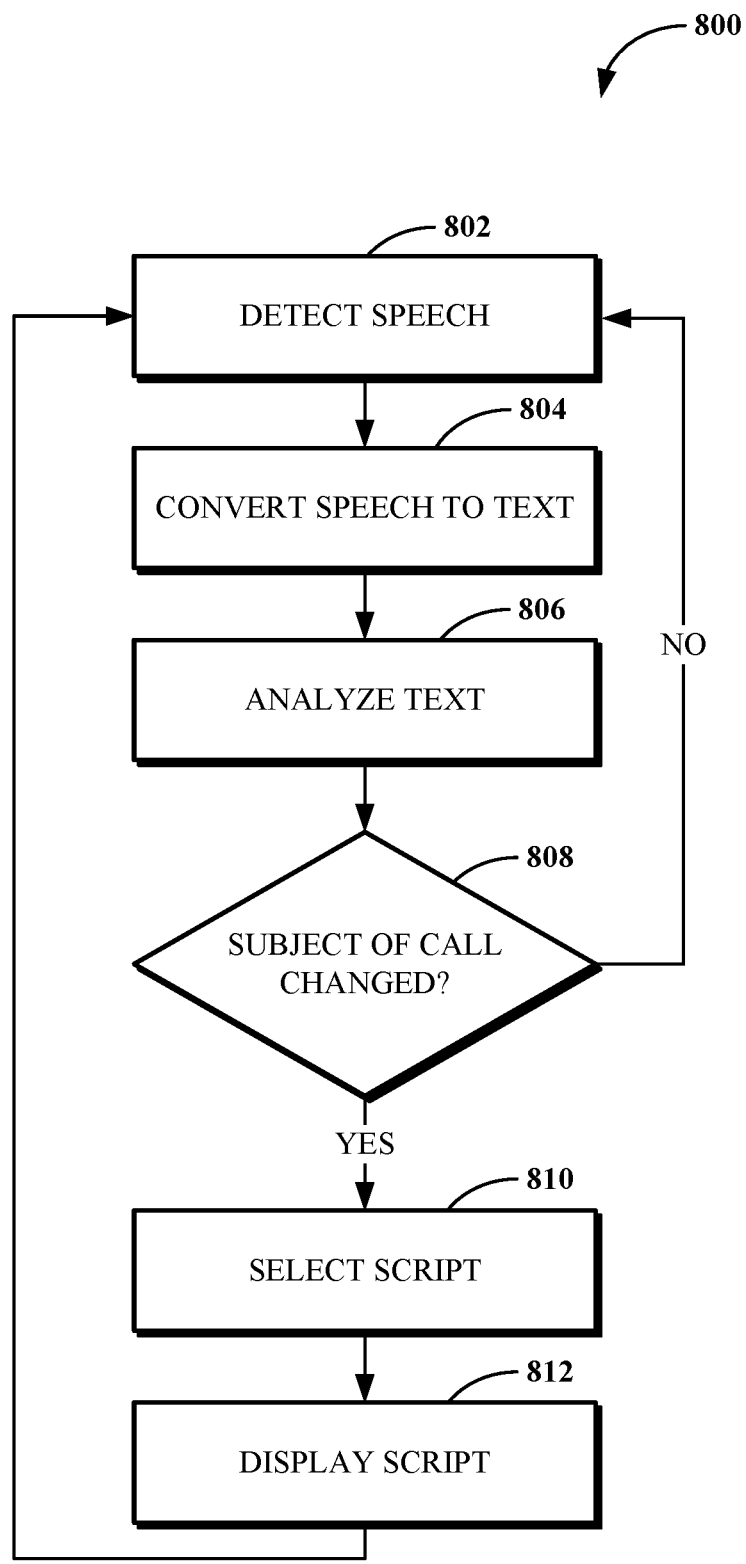
FIG. 8 is a flowchart of an example of a method for automated call queue agent script selection.

To further describe some implementations in greater detail, reference is next made to examples of methods that may be performed by or using a system for automated call queue agent conversation item selection. FIGS. 6 through 8 are flowcharts of examples of methods for automated call queue agent conversation item selection. The methods can be executed using computing devices, such as the systems, hardware, and software described with respect to FIGS. 1 through 5. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flowchart of an example of a method 600 for automated call queue agent conversation item selection. The method 600 may be used to dynamically provide relevant conversation items in real-time to an agent device. The method 600 includes detecting speech in a conversation between a customer and an agent at a server. The detected speech from the customer, the agent, or both, may be converted to text at 604. The server may use an ASR software to convert the speech to text.

The text is analyzed at 606 for one or more keywords. In some examples, location data of the customer may be used to analyze the text for one or more keywords to determine a context for the one or more keywords. For example, certain words or phrases may have one meaning in a regional area and another meaning in another regional area. In an example, the phrase "bless your heart" could have a connotation of sarcasm in the south, whereas elsewhere, it could have a connotation of empathy. Different regional areas could have different keywords, and a keyword in one regional area may not be a keyword in another regional area. In some implementations, different ML models may be used where each ML model is trained based on a regional vernacular. The context of the keywords may vary based on location data such that a keyword may have one meaning in one regional area and another meaning in another regional area. The keywords may be weighted based on the location data of the customer. The weight of the keywords may be used to filter the keywords for further analysis. For example, if the weight of a keyword is below a threshold, it may be discarded from the analysis. The weight of the keyword may be used to determine a caller attribute, such as anger or sarcasm.

At 608, if the text is determined to include one or more keywords, software running on the server may retrieve one or more conversation items at 610. The conversation items may be retrieved from a database, such as database server 110 shown in FIG. 1. The conversation items may be retrieved based on a context of the keywords, a relevance score of the keywords, the location data of the customer, a caller identification (ID) of the customer device, an attribute associated with the keyword, an identified spending habit of the customer, a social media presence of the customer, or any combination thereof.

The relevance score of a conversation item may be determined based on a probabilistic match of the one or more keywords to the conversation item. For example, a conversation item associated with Widget XYZ may have a high relevance score when the one or more keywords is Widget XYZ, and a low relevance score when the one or more keywords is Widget ABC.

The location data of the customer or the caller ID may be used to retrieve a conversation item associated with the location of the customer, such as, for example, a daily bulletin regarding the system state in the zip code of the customer. The keyword may be associated with a caller attribute, for example, certain keywords may indicate that the customer is angry or being sarcastic. In this example, the server may retrieve a coaching script to deal with angry or sarcastic customers.

The caller ID may be used to identify the customer and search one or more databases to obtain spending data or social media data of the customer. The conversation items may be retrieved based on the spending data of the customer, the social media data of the customer, or both. For example, a conversation item retrieved for use with a customer that has spent $50 over a period of time with a company may be different than a conversation item retrieved for use with a customer that has spent $50,000 over the period of time with the company. Similarly, a conversation item may be retrieved based on a social media presence determined from the social media data of the customer. For example, a conversation item retrieved for use with a customer that has a strong social media presence may be different than a conversation item that has a weak social media presence. The strength of the social media presence may be based on a social graph based on a number of social media followers the customer has and a level of engagement the social media followers have with the customer. For example, a customer with a large number of social media followers and a high level of engagement may be determined to have a strong social media presence, a customer with a large number of social media followers with a low level of engagement may be determined to have an average social media presence, and a customer with a small number of social media followers with a low level of engagement may be determined to have a weak social media presence. In an example, the software running on the server may retrieve a script to handle sensitive customers for customers determined to have a strong social media presence to help increase positive social media mentions.

In some examples, a priority may be determined for the retrieved conversation items at 612. The priority may be based on the weight of the keyword, relevance score of the keyword, location of the customer, attribute associated with the keyword, spending data of the customer, social media presence of the customer, or any combination thereof. The retrieved conversation items may be displayed on a UI of an agent device at 614. The retrieved conversation items may be automatically displayed on the UI or the agent device, for example, based on an agent experience level. For example, for an agent with a low experience level, a particular conversation item may be automatically displayed on the UI of the agent device, whereas for an agent with a high experience level, a list of the retrieved conversation items, or links thereto, may be displayed such that the agent may choose the one or more items they deem is most relevant for the current situation. The list of retrieved conversation items may be displayed based on the priority of each retrieved conversation item, for example, in descending priority order starting from the highest priority conversation item.

The software running on the server may continue to monitor the call to determine if other keywords are detected at 602. Detecting the other keywords may indicate that the subject of the call has changed or the attribute of the customer has changed. For example, if the attribute of the customer is determined to have changed from neutral to angry, the software running on the server may retrieve one or more conversation items based on the change in attribute and display the conversation item on the UI of the agent device.

FIG. 7 is a flowchart of an example of another method 700 for automated call queue agent conversation item selection. The method 700 may be used to dynamically provide relevant conversation items in real-time to an agent device. The method 700 includes detecting speech in a conversation between a customer and an agent at a server. A tonal analysis may be performed on the detected speech of the customer, the agent, or both at 704. The tonal analysis may be based on a volume of the detected speech, a pitch of the detected speech, a speed of the detected speech, or any combination thereof. The tonal analysis may be used to determine an attribute of the customer, such as anger or sarcasm, to enhance speech processing. The tonal analysis may include determining an accent of the customer, and may use the location data of the customer to determine the attribute of the customer. The attribute determination may vary from region to region, and the location data of the customer may be used to refine a determined attribute of the customer.

The detected speech from the customer, the agent, or both, may be converted to text at 706. The server may use an ASR software to convert the speech to text. The text is analyzed at 708 for one or more keywords to determine a context for the one or more keywords. In some examples, location data of the customer may be used to analyze the text for one or more keywords. For example, certain words or phrases may have one meaning in a regional area and another meaning in another regional area. In an example, the phrase "isn't that sweet?" could have a connotation of sarcasm in the south, whereas elsewhere, it could have a connotation of a compliment. Different regional areas could have different keywords, and a keyword in one regional area may not be a keyword in another regional area. The context of the keywords may vary based on location data such that a keyword may have one meaning in one regional area and another meaning in another regional area. The keywords may be weighted based on the location data of the customer. The weight of the keywords may be used to filter the keywords for further analysis. For example, if the weight of a keyword is below a threshold, it may be discarded from the analysis. The weight of the keyword may be used to determine a caller attribute, such as anger or sarcasm.

At 710, if the text is determined to include one or more keywords, the software running on the server may retrieve one or more conversation items at 712. The conversation items may be retrieved from a database, such as database server 110 shown in FIG. 1. The conversation items may be retrieved based on a context of the one or more keywords, a relevance score of the one or more keywords, the location data of the customer, a caller ID of the customer device, an attribute associated with the one or more keywords, a determined attribute of the customer, an identified spending habit of the customer, a social media presence of the customer, or any combination thereof.

The relevance score of a conversation item may be determined based on a probabilistic match of the one or more keywords to the conversation item. For example, a conversation item associated with Product A may have a high relevance score when the one or more keywords is Product A, and a low relevance score when the one or more keywords is Product B.

The location data of the customer or the caller ID may be used to retrieve a conversation item associated with the location of the customer, such as, for example, a daily bulletin regarding the system state in the zip code of the customer. The keyword may be associated with a caller attribute, for example, certain keywords may indicate that the customer is angry or being sarcastic. In this example, the server may retrieve a coaching script to deal with angry or sarcastic customers.

The caller ID may be used to identify the customer and search one or more databases to obtain spending data or social media data of the customer. The conversation items may be retrieved based on the spending data of the customer, the social media data of the customer, or both. For example, a conversation item retrieved for use with a customer that has spent less than $5,000 over a period of time with a company may be different than a conversation item retrieved for use with a customer that has spent over $250,000 over the period of time with the company. Similarly, a conversation item may be retrieved based on a social media presence determined from the social media data of the customer. For example, a conversation item retrieved for use with a customer that has a strong social media presence may be different than a conversation item that has a weak social media presence. The strength of the social media presence may be based on a social graph based on a number of social media followers the customer has and a level of engagement the social media followers have with the customer. For example, a customer with a large number of social media followers and a high level of engagement may be determined to have a strong social media presence, a customer with a large number of social media followers with a low level of engagement may be determined to have an average social media presence, and a customer with a small number of social media followers with a low level of engagement may be determined to have a weak social media presence. In an example, the software running on the server may retrieve a script to handle sensitive customers for customers determined to have a strong social media presence to help increase positive social media mentions.

In some examples, a priority may be determined for the retrieved conversation items at 714. The priority may be based on the weight of the keyword, relevance score of the keyword, location of the customer, attribute associated with the keyword, spending data of the customer, social media presence of the customer, or any combination thereof. The retrieved conversation items may be displayed on a UI of an agent device at 716. The retrieved conversation items may be automatically displayed on the UI or the agent device, for example, based on an agent experience level. For example, for an agent with a low experience level, a particular conversation item may be automatically displayed on the UI of the agent device, whereas for an agent with a high experience level, a list of the retrieved conversation items, or links thereto, may be displayed such that the agent may choose the one or more items they deem is most relevant for the current situation. The list of retrieved conversation items may be displayed based on the priority of each retrieved conversation item, for example, in descending priority order starting from the highest priority conversation item.

The software running on the server may continue to monitor the call to determine if other keywords are detected at 702. Detecting the other keywords may indicate that the subject of the call has changed or the attribute of the customer has changed. For example, if the attribute of the customer is determined to have changed from neutral to angry, the software running on the server may retrieve one or more conversation items based on the change in attribute and display the conversation item on the UI of the agent device.

FIG. 8 is a flowchart of an example of a method 800 for automated call queue agent script selection. The method 800 may be used to dynamically provide relevant scripts in real-time to an agent device. The method 800 includes detecting speech in a conversation between a customer and an agent at a server. The detected speech from the customer, the agent, or both, may be converted to text at 804. The server may use an ASR software to convert the speech to text. The text is analyzed at 806 for one or more keywords. In some examples, location data of the customer may be used to analyze the text for one or more keywords to determine a context for the one or more keywords. For example, certain words or phrases may have one meaning in a regional area and another meaning in another regional area. In an example, the word "gnarly" could have one meaning on the west coast, whereas on the east coast, it could have a different meaning. Different regional areas could have different keywords, and a keyword in one regional area may not be a keyword in another regional area. The context of the keywords may vary based on location data such that a keyword may have one meaning in one regional area and another meaning in another regional area. The keywords may be weighted based on the location data of the customer. The weight of the keywords may be used to filter the keywords for further analysis. For example, if the weight of a keyword is below a threshold, it may be discarded from the analysis. The weight of the keyword may be used to determine a caller attribute, such as anger or sarcasm.

At 808, if it is determined that the subject of the call has changed, software running on the server may select a script at 810. Determination of the change in subject of the call may be based on the one or more keywords detected in the text. The script selected at 810 may be selected based on the determined subject of the call. The selected script may be retrieved from a database, such as database server 110 shown in FIG. 1. The selected script may be retrieved based on a relevance score of the keywords, the location data of the customer, a caller ID of the customer device, an attribute associated with the keyword, a determined attribute of the customer, an identified spending habit of the customer, a social media presence of the customer, or any combination thereof.

The relevance score of a script may be determined based on a probabilistic match of the keyword to the script. For example, a script associated with a computing device may have a high relevance score when the keyword is computer, and a low relevance score when the keyword is food processor.

The location data of the customer or the caller ID may be used to retrieve a script associated with the location of the customer, such as, for example, a daily bulletin regarding the system state in the zip code of the customer. The keyword may be associated with a caller attribute, for example, certain keywords may indicate that the customer is angry or being sarcastic. In this example, the server may retrieve a script to deal with angry or sarcastic customers.

The caller ID may be used to identify the customer and search one or more databases to obtain spending data or social media data of the customer. The script may be retrieved based on the spending data of the customer, the social media data of the customer, or both. For example, a script retrieved for use with a customer that has spent less than $200 over a period of time with a company may be different than a script retrieved for use with a customer that has spent $10,000 over the period of time with the company. Similarly, a script may be retrieved based on a social media presence determined from the social media data of the customer. For example, a script retrieved for use with a customer that has a strong social media presence may be different than a script that has a weak social media presence. The strength of the social media presence may be based on a social graph based on a number of social media followers the customer has and a level of engagement the social media followers have with the customer. For example, a customer with a large number of social media followers and a high level of engagement may be determined to have a strong social media presence, a customer with a large number of social media followers with a low level of engagement may be determined to have an average social media presence, and a customer with a small number of social media followers with a low level of engagement may be determined to have a weak social media presence. In an example, the software running on the server may retrieve a script to handle sensitive customers for customers determined to have a strong social media presence to help increase positive social media mentions.

The selected script may be displayed on a UI of an agent device at 812. The selected script may be automatically displayed on the UI or the agent device, for example, based on an agent experience level. For example, for an agent with a low experience level, a particular script may be automatically displayed on the UI of the agent device, whereas for an agent with a high experience level, a list of scripts, or links thereto, may be displayed such that the agent may choose the one or more scripts they deem is most relevant for the current situation. The list of scripts may be displayed based on a priority, for example, in descending priority order starting from the highest priority script.

The software running on the server may continue to monitor the call to determine if other keywords are detected at 802. Detecting the other keywords may indicate that the subject of the call has changed or the attribute of the customer has changed. For example, if the attribute of the customer is determined to have changed from neutral to angry, the software running on the server may retrieve one or more scripts based on the change in attribute and display the one or more scripts on the UI of the agent device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting speech in a call;
   converting the speech to text;
   determining that the text includes one or more keywords based on location data of a caller;
   determining a regional vernacular of the one or more keywords based on the location data;
   determining a context of the one or more keywords based on the regional vernacular;
   retrieving one or more items from a data store based on the context of the one or more keywords and a social media presence strength of the caller based on a number of social media followers;
   generating a user interface (UI) output based on the one or more items; and
   transmitting the UI output to an agent device for display.

2. The method of claim 1, comprising:
   determining a priority for each of the one or more items; and
   transmitting the UI output to display the one or more items as a list based on the determined priority.

3. The method of claim 1, wherein the one or more keywords includes a respective weight based on the location data of the caller.

4. The method of claim 1, wherein the one or more keywords includes a respective weight based on the location data of the caller, the method comprising:
   determining a caller attribute based on the respective weight of the one or more keywords; and
   retrieving the one or more items from the data store based on the caller attribute.

5. The method of claim 1, comprising:
   identifying a caller identity based on a telephone caller identification (ID).

6. The method of claim 1, comprising:
   identifying a caller identity based on a telephone caller identification (ID);
   obtaining spending data of a caller based on the caller identity; and
   retrieving one or more items from the data store based on the spending data of the caller.

7. The method of claim 1, comprising:
   identifying a caller identity based on a telephone caller identification (ID);
   obtaining social media data of a caller based on the caller identity; and
   retrieving one or more items from the data store based on the social media data of the caller.

8. A system, comprising:
   an agent device; and
   a server configured to:
   detect speech in a call;
   convert the speech to text;
   determine that the text includes one or more keywords based on location data of a caller;
   determine a regional vernacular of the one or more keywords based on the location data;
   determine a context of the one or more keywords based on the regional vernacular;
   retrieve one or more items from a data store based on the context of the one or more keywords and a social media presence strength of the caller based on a number of social media followers;
   generate a user interface (UI) output based on the one or more items; and
   transmit the UI output to the agent device for display.

9. The system of claim 8, wherein the server is configured to:
   determine a priority for each of the one or more items; and
   transmit the UI output to display the one or more items on the display of the agent device as a list based on the determined priority.

10. The system of claim 8, wherein the one or more keywords includes a respective weight based on the location data of the caller.

11. The system of claim 8, wherein the one or more keywords includes a respective weight based on location data of a caller, the server configured to:
    determine a caller attribute based on the respective weight of the one or more keywords; and
    retrieve the one or more items from the data store based on the caller attribute.

12. The system of claim 8, wherein the server is configured to:
    identify a caller identity based on a telephone caller identification (ID).

13. The system of claim 8, wherein the server is configured to:
    identify a caller identity based on a telephone caller identification (ID);
    obtain spending data of a caller based on the caller identity; and
    retrieve one or more items from the data store based on the spending data of the caller.

14. The system of claim 8, wherein the server is configured to:
    identify a caller identity based on a telephone caller identification (ID);
    obtain social media data of a caller based on the caller identity; and
    retrieve one or more items from the data store based on the social media data of the caller.

15. A non-transitory computer-readable medium comprising instructions stored on a memory, that when executed by a processor, cause the processor to:
    detect speech in a call;
    convert the speech to text;
    determine that the text includes one or more keywords based on location data of a caller;
    determine a regional vernacular of the one or more keywords based on the location data;
    determine a context of the one or more keywords based on the regional vernacular;

retrieve one or more items from a data store based on the context of the one or more keywords and a social media presence strength of the caller based on a number of social media followers;

generate a user interface (UI) output based on the one or more items; and transmit the UI output to an agent device for display.

16. The non-transitory computer-readable medium of claim 15, wherein the instructions, when executed by the processor, cause the processor to:

determine a priority for each of the one or more items; and transmit the UI output to display the one or more items on the display of the agent device as a list based on the determined priority.

17. The non-transitory computer-readable medium of claim 15, wherein the instructions, when executed by the processor, cause the processor to:

determine a caller attribute based on weights of one or more keywords; and retrieve the one or more items from the data store based on the caller attribute.

18. The non-transitory computer-readable medium of claim 15, wherein the instructions, when executed by the processor, cause the processor to:

identify a caller identity based on a telephone caller identification (ID);

obtain spending data of a caller based on the caller identity; and retrieve one or more items from the data store based on the spending data of the caller.

19. The non-transitory computer-readable medium of claim 15, wherein the instructions, when executed by the processor, cause the processor to:

identify a caller identity based on a telephone caller identification (ID);

obtain social media data of a caller based on the caller identity; and retrieve one or more items from the data store based on the social media data of the caller.

20. The non-transitory computer-readable medium of claim 15, wherein the instructions, when executed by the processor, cause the processor to:

identify a caller identity based on a telephone caller identification (ID).

* * * * *